United States Patent
Kim

(10) Patent No.: US 9,293,923 B2
(45) Date of Patent: Mar. 22, 2016

(54) ENERGY STORAGE SYSTEM AND CONTROLLING METHOD OF THE SAME

(75) Inventor: Seong-Joong Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 851 days.

(21) Appl. No.: 13/564,694

(22) Filed: Aug. 1, 2012

(65) Prior Publication Data

US 2013/0154369 A1    Jun. 20, 2013

Related U.S. Application Data

(60) Provisional application No. 61/577,240, filed on Dec. 19, 2011.

(51) Int. Cl.
*H02J 3/28* (2006.01)
*H02J 9/06* (2006.01)

(52) U.S. Cl.
CPC . *H02J 3/28* (2013.01); *H02J 9/062* (2013.01); *Y10T 307/367* (2015.04)

(58) Field of Classification Search
CPC ........ H02J 3/28; H02J 9/062; Y10T 307/367; Y10T 307/26
USPC ................................ 307/26, 64, 66; 700/26.1
See application file for complete search history.

(56) References Cited

U.S. PATENT DOCUMENTS

| | | |
|---|---|---|
| 2011/0140648 A1 | 6/2011 | Lee |
| 2011/0291479 A1 | 12/2011 | Lee |
| 2012/0316690 A1 | 12/2012 | Li et al. |

FOREIGN PATENT DOCUMENTS

| | | |
|---|---|---|
| CN | 102104251 A | 6/2011 |
| CN | 102208815 A | 10/2011 |
| JP | 2008-182851 | 8/2008 |
| KR | 10-2011-0057557 A | 6/2011 |
| KR | 10-2011-0068640 A | 6/2011 |
| KR | 10-2011-0093531 A | 8/2011 |
| KR | 10-2011-0132122 | 12/2011 |

OTHER PUBLICATIONS

KIPO Office action dated Aug. 20, 2013, for corresponding Korean Patent application 10-2012-0100001, (5 pages).
KIPO Office action dated Feb. 11, 2014, for corresponding Korean Patent application 10-2012-0100001, (1 page).
SIPO Office action dated Nov. 4, 2015, for corresponding Chinese Patent application 201210334882.6, (10 pages).

*Primary Examiner* — Jared Fureman
*Assistant Examiner* — James P Evans
(74) *Attorney, Agent, or Firm* — Lewis Roca Rothgerber Christie LLP

(57) ABSTRACT

An energy storage system including: a battery; a power conditioning system coupled to the battery, switches coupleable to an internal load of the power conditioning system, the battery, a grid, or an external load; and a controller to: receive energy usage cost information of the grid and residual capacity information of the battery; determine which of an energy of the battery or the grid is to be provided to the external load, and to determine which of the energy of the battery or the grid is to be provided to the internal load, according to the energy usage cost information and the residual capacity information; and control the switches according to the determination to provide the energy of the battery or the grid to the external load, and to provide the energy of the battery or the grid to the internal load.

14 Claims, 4 Drawing Sheets

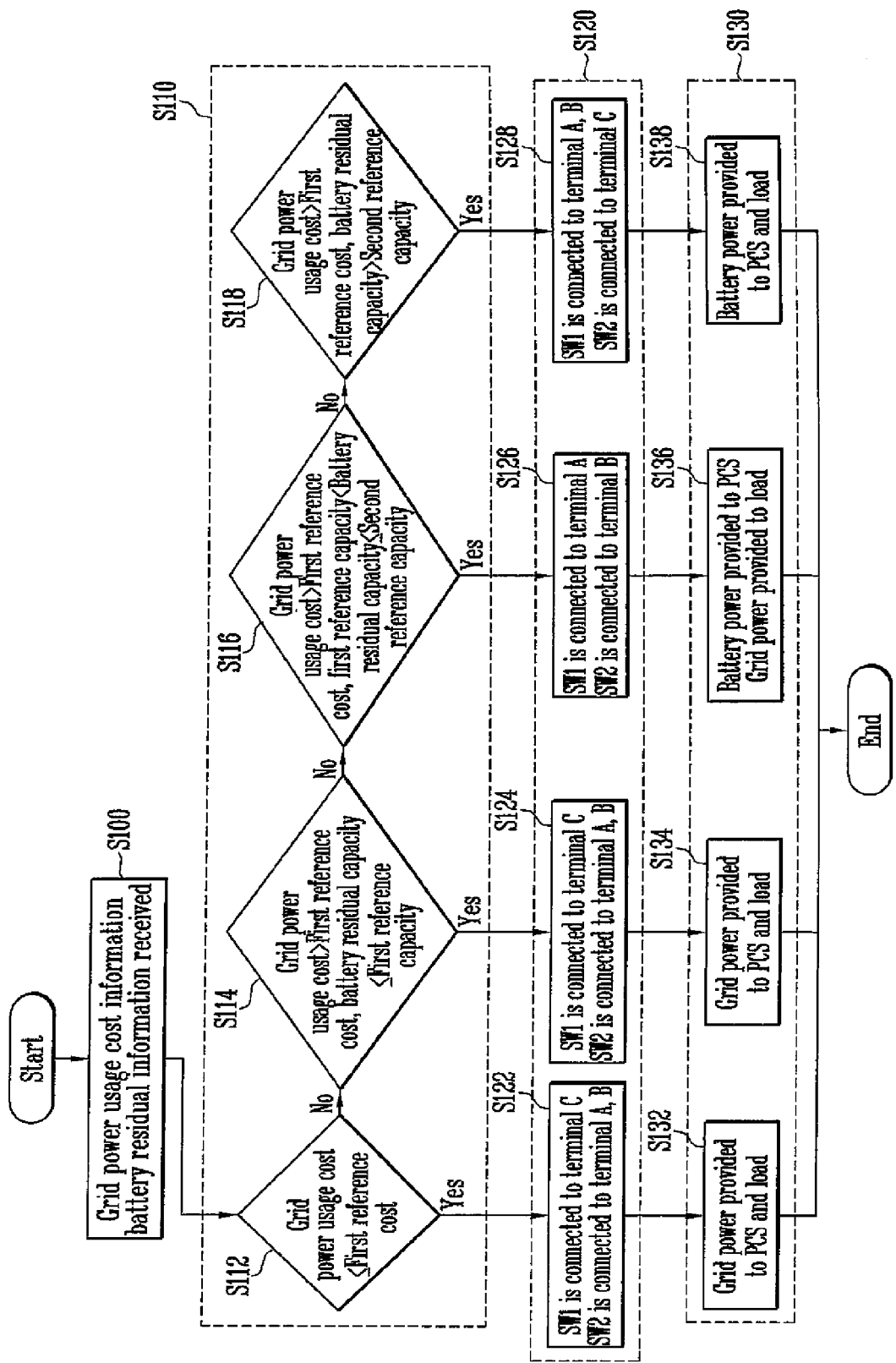

ENERGY STORAGE SYSTEM AND CONTROLLING METHOD OF THE SAME

CROSS-REFERENCE TO RELATED APPLICATION

This application claims priority to and the benefit of U.S. Provisional Application No. 61/577,240, filed on Dec. 19, 2011, in the USPTO, the disclosure of which is incorporated herein in its entirety by reference.

BACKGROUND

1. Field

An aspect of the present invention relates to an energy storage system, and more particularly to an energy storage system and a method of controlling the same.

2. Description of the Related Art

Demand for a system for storing energy and efficiently utilizing the stored energy increases as problems such as environmental destruction, resource depletion, and the like occur. In addition, the relative importance of renewable energy, for example, solar energy, wind power, tidal power and/or the like, and preventing pollution generated in the production of energy continues to increase.

A energy storage system is a system for coupling a power generating system (e.g., a renewable energy generating system), a battery for storing energy, and an existing grid.

Further, the energy storage system serves to couple the power generating system and the grid to supply energy to a load.

The energy storage system uses energy to drive a power conditioning system, which is called an internal consumption energy of the energy storage system. In the related art, if the grid is at a normal state, the energy of the grid is used to provide the internal consumption energy and the energy to the load, and if the grid is at a non-steady state, such as a blackout, the energy storage system uses a battery power source provided at the energy storage system to provide the internal consumption energy and the energy to the load because the energy storage system performs an Uninterruptible Power Supply (UPS) operation.

However, since an energy usage cost (or charge) of the grid changes (for example, changes depending on a time), if the grid is in the normal state, it may not be efficient (e.g., economically efficient) to use the power of the grid as the internal consumption power (or the load power).

SUMMARY

Aspects of embodiments of the present invention provide for an energy storage system and a method of controlling the same to provide more efficient energy (e.g., economically efficient) and minimize (or reduce) an energy usage cost by selecting a subject (e.g., an energy source) to provide the energy to an inner portion of the energy storage system and a load (e.g., an external load) depending on an energy usage cost (or charge) of the grid (or other power generation source) and a residual capacity of a battery.

In order to provide for aspects of embodiments of the present invention, the energy storage system includes a battery; a power conditioning system coupled to the battery, switches configured to be coupleable to one or more of an internal load of the power conditioning system, the battery, a grid, or an external load; and a controller being configured to: receive energy usage cost information of the grid and residual capacity information of the battery, determine which of an energy of the battery or an energy of the grid is to be provided to the external load, and to determine which of the energy of the battery or the energy of the grid is to be provided to the internal load, according to the energy usage cost information of the grid and the residual capacity information of the battery; and control the switches according to the determination to provide the energy of the battery or the energy of the grid to the external load, and to provide the energy of the battery or the energy of the grid to the internal load.

In an embodiment, the switches may include a first switch configured to provide the energy of the battery to at least one of the external load or the internal load; and a second switch configured to provide the energy of the grid to at least one of the external load or the internal load.

The first switch may include a first terminal coupled to the battery; a second terminal coupled to the internal load; a third terminal coupled to the external load; and a fourth terminal not coupled to any of the external load and the internal load, and wherein the first switch is configured to couple the first terminal to at least one of the second terminal, the third terminal, or the fourth terminal, according to a signal from the controller. In one embodiment, the first terminal may be coupled to the battery through the power conditioning system.

The second switch may include a first terminal coupled to the grid; a second terminal coupled to the internal load; a third terminal coupled to the external load; and a fourth terminal not coupled to any of the external load and the internal load, wherein the second switch is configured to couple the first terminal to at least one of the second terminal, the third terminal, or the fourth terminal according to a signal from the controller.

The controller may include a battery residual capacity information device configured to receive the residual capacity information of the battery; a grid energy usage cost information device configured to receive the energy usage cost information of the grid; and a switch controller configured to control the first switch and the second switch according to the received residual capacity information and the received energy usage cost information. In one embodiment, the battery residual capacity information device may be configured to store a value of a first reference capacity and a value of a second reference capacity; calculate a capacity value according to a comparison of the received residual capacity information of the battery with the first reference capacity and the second reference capacity; and transmit the capacity value to the switch controller. In one embodiment, the grid energy usage cost information device may be configured to store a first reference charge value; calculate an energy usage cost value according to a comparison of the received energy usage cost information of the grid with the first reference charge value; and transmit the energy usage cost value to the switch controller.

The power conditioning system may include an energy conversion device configured to convert an energy generated from a generating system to a DC link voltage; an inverter configured to invert the DC link voltage to an AC voltage of the grid or to convert the AC voltage of the grid to the DC link voltage; a converter configured to convert the DC link voltage to a battery voltage for charging the battery or convert the battery voltage to the DC link voltage; a battery management system coupled to the battery, the battery management system being configured to control a charging and discharging operation of the battery; and a power conditioning controller configured to monitor the generating system, the grid, the battery, and the load, and configured to control the energy conversion device, the inverter, converter, and the battery management system.

In order to provide aspects of embodiments of the present invention, a method of controlling an energy storage including a power conditioning system and a battery is provided, the method including receiving energy usage cost information of a grid and residual capacity information of the battery; determining which of an energy of the battery or an energy of the grid is to be provided to an external load, and determining which of the energy of the battery or the energy of the grid is to be provided to an internal load, according to the energy usage cost information of the grid and the residual capacity information of the battery; and providing at least one of the energy of the grid or the energy of the battery to the internal load of the energy storage system or the external load.

The method may further include storing a reference cost relating to a grid power usage cost value; storing a first reference capacity relating to a residual capacity of the battery; storing a second reference capacity relating to the residual capacity of the battery higher than the first reference capacity; performing an operation comprising at least one of: comparing the energy usage cost information of the grid with the reference cost, or comparing the residual capacity information of the battery with at least one of the first reference capacity or the second reference capacity; and controlling a coupling with the internal load, the external load, and the battery and a coupling with the internal load, the external load, and the grid based on the operation.

In one embodiment, the method may further include providing the energy of the grid to the external load and to the internal load when the energy usage cost information of the grid is below the reference cost.

In one embodiment, the method may further include providing the energy of the grid to the external load and to the internal load when the energy usage cost information of the grid is above the reference cost and the residual capacity information of the battery is below the first reference capacity.

In one embodiment, the method may further include providing the energy of the grid to the external load and providing the energy of the battery to the internal load when the energy usage cost information of the grid is above the reference cost, and the residual capacity information of the battery is above the first reference capacity and is below the second reference capacity.

In one embodiment, the method may further include providing the energy of the battery to the external load and to the internal load when the energy usage cost information of the grid is above the reference cost and the residual capacity information of the battery is above the second reference capacity.

BRIEF DESCRIPTION OF THE DRAWINGS

FIG. 3 is a flowchart showing a method of controlling an energy storage system according to an embodiment of the present invention.

DETAILED DESCRIPTION

In the following detailed description, only certain embodiments of the present invention have been shown and described, simply by way of illustration. As those skilled in the art would recognize, the invention may be embodied in many different forms and should not be construed as being limited to the embodiments set forth herein. Also, in the context of the present application, when an element is referred to as being "coupled to" another element, it may be directly "coupled to" the another element or be indirectly "coupled to" the another element with one or more intervening elements interposed therebetween.

Embodiments of the present invention will be described with reference to accompanying drawings in detail.

Figure 1A:
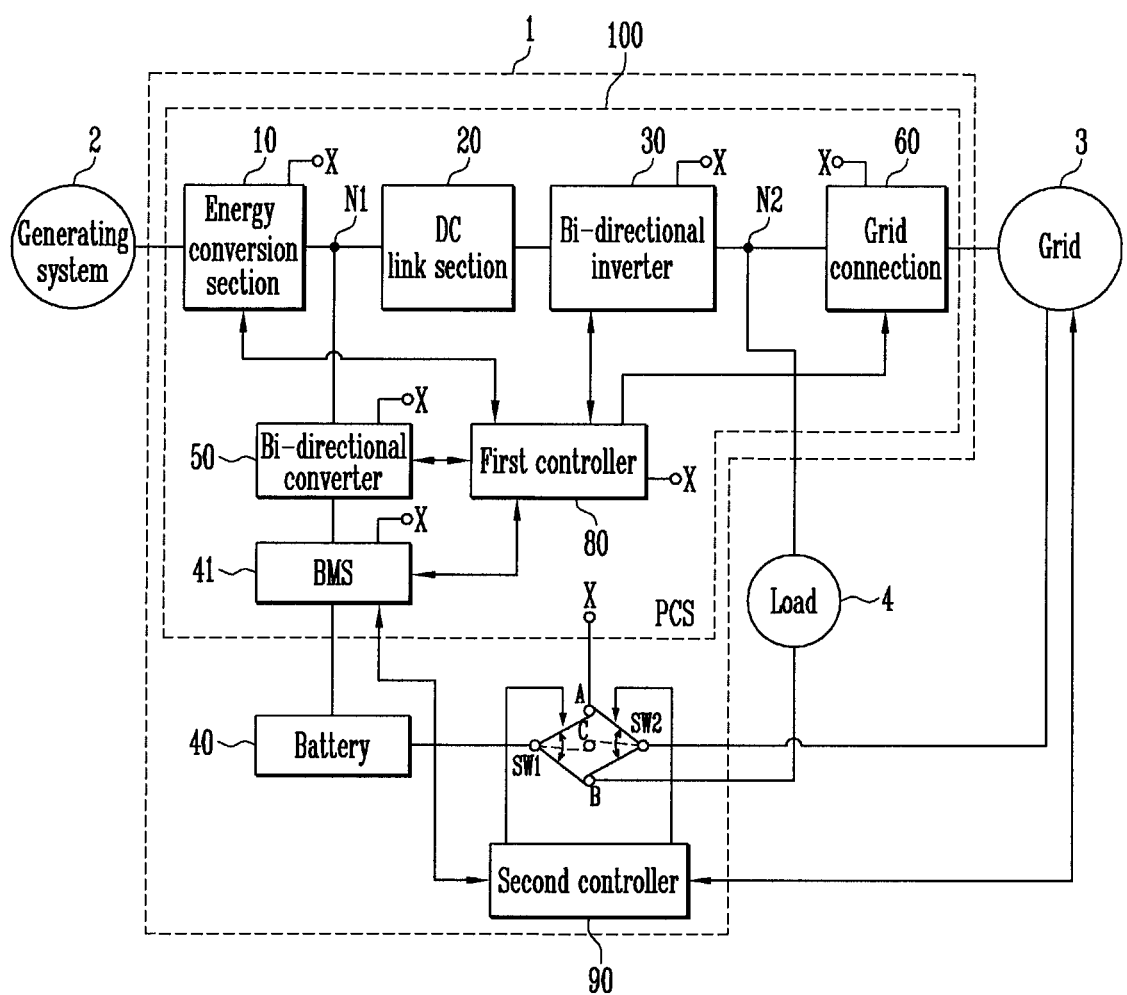
FIG. 1A is a block diagram showing a configuration of an energy storage system according to an embodiment of the present invention.
Figure 1B:
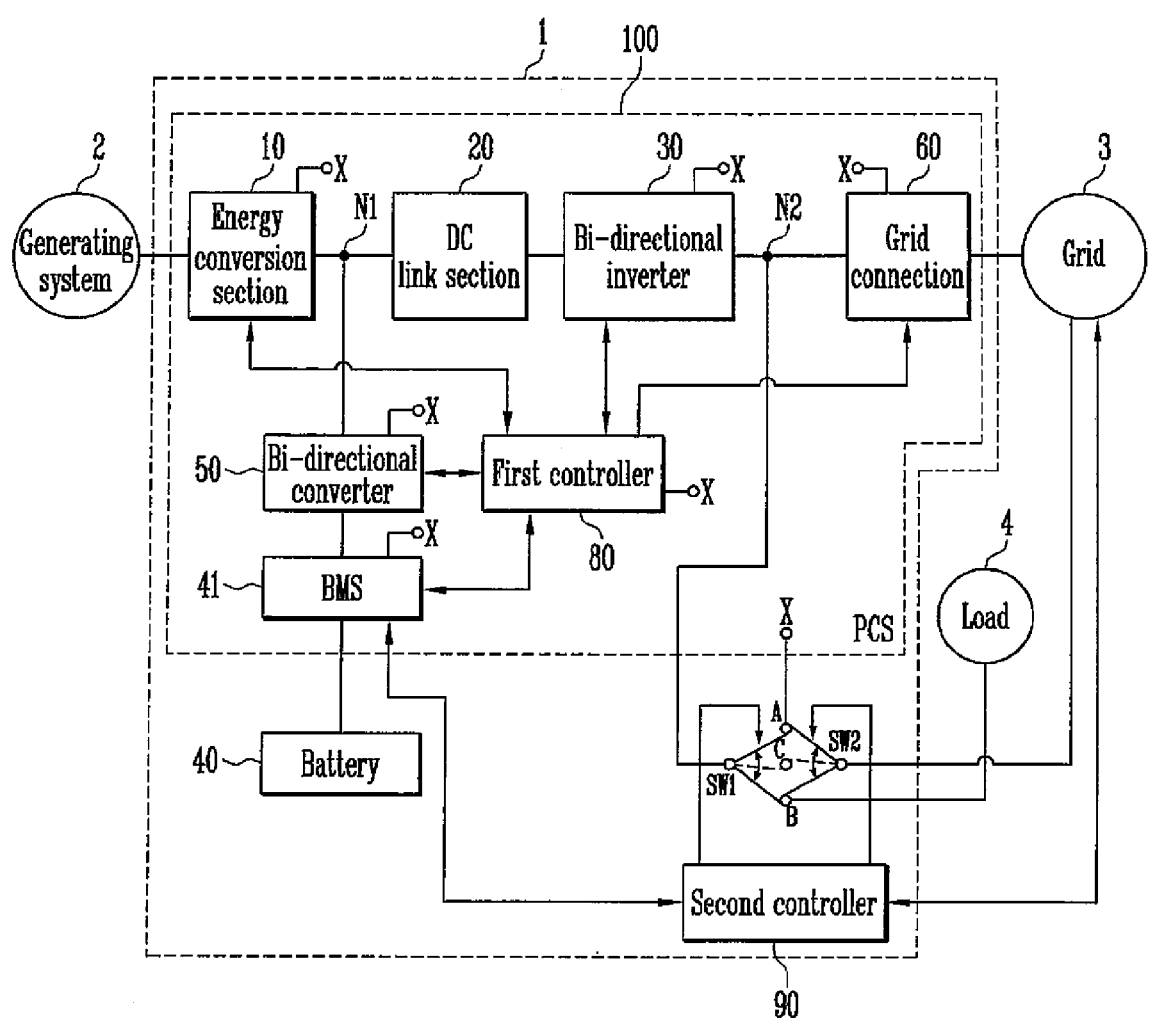
FIG. 1B is a block diagram showing a configuration of an energy storage system according to another embodiment of the present invention.
Figure 2:
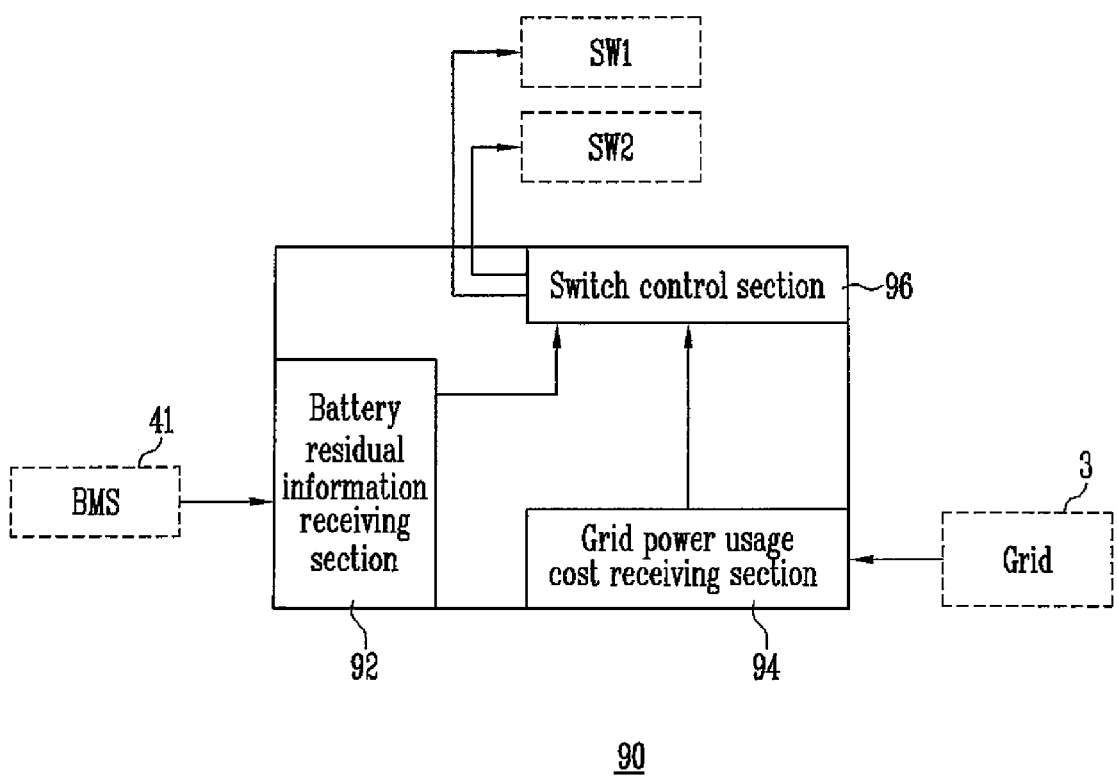
FIG. 2 is a schematic block diagram showing a configuration of a second controller shown in FIG. 1A and FIG. 1B.

FIG. 1A is a block diagram showing a configuration of an energy storage system according to an embodiment of the present invention, FIG. 1B is a block diagram showing a configuration of an energy storage system according to another embodiment of the present invention, and FIG. 2 is a schematic block diagram showing a configuration of a second controller shown in FIGS. 1A and 1B.

Referring to FIG. 1A, the energy storage system 1 according to an embodiment of the present invention may be coupled (e.g., connected, or electrically coupled) to a generating system 2 (e.g., a renewable energy generation system), a grid 3 (e.g., the utility), or both, to supply a power to a load 4 (e.g., an external load). The energy storage system may include a power conditioning system (PCS) 100 and a battery 40. The PCS 100 may include an energy (or power) converting section 10, a DC link section 20, an inverter 30 (e.g., a bi-directional inverter), a battery management system (BMS) (41), a converter 50 (e.g., a bi-directional converter), and a first controller 80. In addition, the energy storage system 1 according to an embodiment of the present invention provides for a more efficient (e.g., cost efficient or economical) power consumption to minimize or reduce an energy usage cost (or charge) by selecting an energy source provided to the load 4 and an internal load X based on the energy usage cost of the grid 3 and/or a residual capacity of the battery. The internal load X may be the internal energy consumption of the energy storage system 1 (e.g., the operating power of elements of the PCS 100).

An embodiment of the present invention may further include a second controller 90 to receive the energy usage cost (or charge) information of the grid 3 and the residual capacity information of the battery 40. Additionally, an embodiment of the present invention may include a first switch (SW1) and a second switch (SW2), which may be operated to provide the power of the grid 3 or the battery 40 to the external load 4 or the internal load X according to a control signal provided from the second controller 90.

In an embodiment of the present invention, the generating system 2 is a system for producing power using an energy source (e.g., a renewable energy source). The generating system 2 may supply its produced power to the energy storage system 1. The generating system 2 may be a solar power system, a wind power generating system, a tidal power system, or other renewable energy generating system producing power using a renewable energy source such as solar, geothermal heat, and/or the like.

For example, a solar cell producing an electrical energy using the light of the sun may be installed at a home or a factory and may be suitable to use with the energy storage system 1, which may be distributed at each household. The generating system 2 may provide a plurality of modules in parallel to produce the power for each module.

The grid 3 may include a power plant, a substation, and transmission lines. If the grid 3 is in a normal state, the grid 3 may supply power to the energy storage system 1 or load 4 and may receive power supplied from the energy storage system 1 (e.g., power generated by the generating system 2 or stored in the battery 40). If the grid 3 is in an abnormal state, the power may no longer flow from the grid 3 to the energy storage system 1 or from the energy storage system 1 to the grid 3.

In an embodiment of the present invention, the load 4 refers to consuming a power produced by a generating system 2, a power stored in the battery 40, or a power supplied from the grid 3. The load 4 may be the household, the factory, and/or the like.

The energy storage system 1 may store the power generated by the generating system 2 into the battery 40, and may send the generated power to the grid 3. In addition, the energy storage system 1 may transfer the power stored in the battery 40 to the grid 3, or store the power supplied from the grid 3 in the battery 40. In addition, if the energy storage system 1 is in an abnormal state, for example, when a blackout of the grid 3 occurs, the energy storage system 1 may perform an uninterruptible power supply (UPS) operation to supply power to the load 4. For example, the energy storage system 1 may supply the power generated by the generating system 2 or the power stored in the battery 40 to the load 4.

In an embodiment of the present invention, the energy storage system 1 includes a power conditioning system (PCS) 100 and a battery 40. The PCS 100 may include an energy conversion section 10, a DC link section 20, an inverter 30, a battery management system (BMS) 41, a converter 50, a grid connection 60, and a first controller 80. The inverter 30 and the converter 50 may be implemented as a bi-directional inverter 30 and a bi-directional converter 50, and the embodiments shown in FIGS. 1A and 1B, including the bi-directional inverter 30 and the bi-directional converter 50, will be described as a non-limiting example.

The energy conversion section 10 may be coupled between the generating system 2 and a first node (N1) to convert the electric power produced from the generating system 2 into a DC electric power at a first node (N1). An operation of the energy conversion section 10 may be changed based on the electric power generated from the generating system 2. For example, when the generating system 2 generates AC electric power, the energy conversion section 10 converts the AC electric power into the DC electric power of the first node (N1). In addition, when DC electric power is generated from the generating system 2, the voltage the DC electric power is boosted or reduced (e.g., bucked) to the voltage of the DC electric power of the first node (N1).

For example, if the generating system 2 is a solar generating system, the energy converter section 10 may be a Maximum power point tracking converter (MPPT) detecting a maximum power point and producing the electric power according to a solar insolation change (e.g., a change in solar power per unit area received by the generating system 2), or according to a change in temperature caused by the heat of the sun. However, the energy conversion section 10 is not limited thereto and may include, for example, various kinds of converters and/or rectifiers.

The DC link section 20 may be coupled between the inverter (e.g., bi-directional inverters) 30 and the converter (e.g., the bi-directional converter) to maintain DC link electric power (Vlink) of the first node (N1) constant (or substantially constant).

The voltage level at the first node (N1) may become unstable due to an instantaneous voltage drop of the generating system 2 or the grid 3, or due to a peak load consumption in the load 4. However, it may be beneficial for the first node (N1) voltage to maintain a constant (or substantially constant) voltage level to suitably perform the stable operation of the inverter (e.g., bi-directional inverter) 30 and the converter (e.g., bi-directional converter) 50. To this end, the DC link section 20 may include a capacitor (or a plurality of capacitors), such as, an aluminum electrolytic capacitor, an high-pressure film polymer capacitor, or a multi-layer ceramic capacitor (MLSS) for a high voltage and high current.

The battery 40 may be supplied with, and may store, the electric power produced from the generating system 2 or the electric power of the grid 3, and may supply the stored electric power to the load 4, the internal load X, or the grid 3. The battery 40 may include at least one battery cell, and each battery cell may include a plurality of bare cells. The battery 40 may include various kinds of battery cells, for example a nickel-cadmium battery, a lead battery, a nickel metal hydride battery (NiMH), a lithium ion battery, a lithium polymer battery, and/or the like. The number of battery cells of the battery 40 may be determined (or provided) based on, for example, a power capacity or a design condition required at the energy storage system 1. As a further illustration, if power consumption is relatively large, a plurality of battery cells of the battery 40 may be provided, and if a power consumption is relatively small, only one battery cell of the battery 40 may be provided.

In an embodiment of the present invention, the BMS 41 is coupled to the battery 40 to control a charging and discharging operation. The BMS 41 may be controlled by a first controller (e.g., an integrated controller) 80. The BMS (41) may perform an overcharge protection function, an overdischarge protection function, an overcurrent protection function, an overvoltage protection function, an overheating protection function, a cell balancing function, and/or the like. To this end, the BMS 41 may monitor a voltage, a current, a temperature, a residual electric power amount, a life, a charge status, and/or the like of the battery 40, and may transfer the associated information to the first controller 80. In an embodiment of the present invention, the BMS 41 is separated from the battery 40, but may include a battery pack integral with the BMS 41 and the battery 40.

In an embodiment of the present invention, the converter (e.g., the bi-directional converter) 50 converts a voltage of the electric power output from the battery 40 into a DC voltage level, that is the DC link voltage (Vlink), in a DC-DC manner. In addition, the converter (e.g., bi-directional converter) 50 may convert a charging electric power flowing through the first node (N1) into the voltage level of the battery 40 in a DC-DC manner. The charge electric power may be, for example, an electric power produced from the generating system 2, or a power supplied through the inverter (e.g., bi-directional inverter) 30 from the grid 3.

In an embodiment of the present invention, the inverter (e.g., the bi-directional inverter) 30 is the electric converter provided between the second node (N2) and the first node (N1), and coupled to the load 4 or the grid connection 60. The inverter (e.g., the bi-directional inverter) 30 may convert the DC link voltage (Vlink), output from the generating system 2 or the battery 40, into the AC voltage of the grid 3. In addition, the inverter (e.g., the bi-directional inverter) 30 may rectify the AC voltage, and may convert the rectified AC voltage into the DC link voltage (Vlink). The inverter (e.g., the bi-directional inverter) 30 may include a filter for eliminating harmonics from the AC voltage output from the grid 3, and may include a phase locked loop for synchronizing a phase of the AC voltage output from the inverter (e.g., the bi-directional inverter) 30 with a phase of the AC voltage of the grid 3 to suppress (or reduce) a reactive power.

In addition, the inverter (e.g., the bi-directional inverter) 30 may perform functions such as a voltage fluctuation range limiting, a power factor correction, a DC component elimination, a transient phenomena protection, and/or the like.

In an embodiment of the present invention, the grid connection 60 is coupled between the electrical grid 3 and the inverter (e.g., the bi-directional inverter) 30. When the abnormal status occurs at the grid 3, the grid connection 60 blocks (e.g., opens or interrupts) the connection with the energy storage system 1 and the grid 3 under the control of the first controller 80.

The grid connection 60 may include, for example, a switching element, junction transistor (BJT), or a field effect transistor (FET).

Although not shown in the drawings, another connector may be included in the PCS 100 between the inverter (e.g., the bi-directional inverter) 30 and the load 4. This additional connector may be coupled to the grid connection 60 in series and may block the electrical power from flowing into the load 4 under the control of the first controller 80. This additional connector may include, for example, a switching element, a junction transistor (BJT), a field effect transistor (FET), and/or the like.

In an embodiment of the present invention, the first controller 80 monitors the status of the generating system 2, the grid 3, the battery 40, and the load 4, and controls the energy conversion section 10, the inverter (e.g., the bi-directional inverter) 30, the BMS 41, the converter (e.g., the bi-directional converter) 50, and the grid connection 60 based on the monitoring result.

In an embodiment of the present invention, the energy storage system 1 uses an electrical power to drive the power conditioning system included at the internal portion thereof, which is called an internal consumption electrical power of the energy storage system 1, i.e., the internal load X.

For example, electrical power may be used to drive the energy conversion section 10, the inverter (e.g., the bi-directional inverter) 30, the converter (e.g., the bi-directional converter) 50, the grid connection 60, the BMS 41, the first controller 80, and/or the like.

In the related art, if the grid 3 is in a normal state, the internal load X (e.g., the internal consumption power) is supplied by the electrical power of the grid 3, and if the grid 3 is in an abnormal state, such as a blackout, the internal load X is supplied by the battery 40 provided in the energy storage system 1 because the energy storage system performs an uninterruptible power supply operation. However, because the electrical power usage cost (or charge) of the grid 3 may change (e.g., may be differently applied according to time), it may not always be reasonable (e.g., economical) to use the power of the grid 3 as the internal consumption electrical power (e.g., the power to supply the internal load X).

Accordingly, aspects of embodiments of the present invention provide for more efficient (e.g., economically efficient) electrical power consumption, and minimize or reduce the electrical usage cost (or charge) by selecting the subject (e.g., the power source) providing the electrical power applied to the power conditioning system 100 (e.g., the internal load X) or the load 4 based on the energy usage cost (or charge) of the grid 3 and the residual capacity of the battery 40.

An embodiment of the present invention may further include a second controller 90 to receive the energy usage charge information of the grid 3 and the residual capacity information of the battery 40, and may further include a first switch (SW1) and a second switch (SW2) operating such that the power of the battery 40 or the grid 3 is provided to the internal load X and/or the load 4 according to a control signal provided from the second controller 90.

For example, the first switch (SW1) may couple the battery 40 to the internal load X of the power conditioning system (PCS) 100 and/or to the load 4 in order to apply the power of the battery 40 to the internal load X and/or the load 4.

The first switch (SW1) may be coupled to (or coupleable to) at least one of an A terminal coupled to the internal load X of the power conditioning system (PCS) 100, a B terminal coupled to the load 4 (e.g., the external load), and a "plotted" C terminal, meaning that the C terminal is not coupled to the internal load X of the power conditioning system 100 or to the load 4 (i.e., the C terminal is in a plotting state).

In an embodiment of the present invention, when the first switch SW1 is coupled to the A terminal, the electrical power of the battery 40 is applied to the internal load X of the power conditioning system 100, when the first switch SW1 is coupled to the B terminal, the electrical power of the battery 40 is applied to the load 4, and when the first switch is only coupled to the C terminal, the power of the battery 40 is not applied to the power conditioning system 100 or the load.

In addition, when the first switch SW1 is coupled (e.g., simultaneously coupled or contemporaneously coupled) to both the A terminal and the B terminal, the electrical power of the battery 40 may be applied to the internal load X of the power conditioning system 100 and the load 4.

Additionally, the second switch (SW2) may couple the grid 3 to the internal load X of the power conditioning system (PCS) 100 and/or the load 4 (e.g., the external load) to apply the power of the grid 3 to the internal load X and/or the load 4.

For example, the second switch (SW2) may be coupled to at least one of the A terminal coupled to the internal load X of power conditioning system (PCS) 100, the B terminal coupled to the load 4, and the C terminal not coupled to the internal load X of the power conditioning system 100 or the load 4.

In an embodiment of the present invention, when the second switch SW2 is coupled to the A terminal, the electrical power of the grid 3 is applied to the internal load X of the power conditioning system 100, when the second switch SW2 is coupled to the B terminal, the electrical power of the grid 3 is applied to the load 4, and when the second switch SW2 is only coupled to the C terminal, the power of the grid 3 is not coupled to the internal load X of the power conditioning system 100 or the load 4.

In addition, when the second switch SW2 is coupled (e.g., simultaneously coupled or contemporaneously coupled) to both of the A terminal and the B terminal, the electric power of the grid 3 is applied to the internal load X of the power conditioning system 100 and the load 4.

Referring now to FIG. 1B, FIG. 1B is a block diagram showing a configuration of an energy storage system according to another embodiment of the present invention. Since the energy storage system according to the present embodiment may include the same (or substantially the same) elements as previously described in connection with FIG. 1A, descriptions of certain aspects of the present embodiment are given by way of reference to the above descriptions and will not be described in detail herein.

The energy storage system of FIG. 1B is similar to the energy storage system of FIG. 1A except as to the coupling between the first switch SW1 and the battery 40. For example, where SW1 is shown in FIG. 1A as applying the energy of the battery 40 directly to the A, B, and/or C terminals, SW1 is shown in FIG. 1B as applying the energy of the battery to the A, B, and/or C terminals after the energy of the battery has been conditioned (e.g., converted into an AC voltage) by the power conditioning system (PCS) 100.

A first switch (SW1) may couple a second node (N2) of a power conditioning system 100 to an internal load X of the power conditioning system (PCS) 100 and/or to the load 4 in order to apply the power at the second node (N2) to the internal load X and/or the load 4. The power at the second node (N2) may be a power of the battery 40 that has been converted to a DC link voltage (Vlink) and then inverted to an AC voltage. Additionally, the power at the second node (N2) may not only be the power of the battery 40, but may also be the power of a generating system 2.

The first switch (SW1) may be coupled to (or coupleable to) at least one of an A terminal coupled to the internal load X of the power conditioning system (PCS) 100, a B terminal coupled to the load 4 (e.g., the external load), or a C terminal not coupled to the internal load X of the power conditioning system 100 or the load 4.

In an embodiment of the present invention, when the first switch SW1 is coupled to the A terminal, the electrical power of the battery 40 is applied to the internal load X of the power conditioning system 100, when the first switch SW1 is coupled to the B terminal, the electrical power of the battery 40 is applied to the load 4, and when the first switch only coupled to the C terminal, the power of the battery 40 is not applied to the internal load X of the power conditioning system 100 or the load 4.

In addition, when the first switch SW1 is coupled (e.g., simultaneously coupled or contemporaneously coupled) to both the A terminal and the B terminal, the electrical power of the battery 40 may be applied to the internal load X of the power conditioning system 100 and the load 4.

The first and second switches (SW1, SW2) may be designed to provide a hardware configuration such as the embodiments shown in FIG. 1A or FIG. 1B, but are not limited to thereto, and, as may be apparent to those skilled in the art, other hardware or logic implementations may be provided while still keeping with the spirit and scope of the present disclosure and claims.

Referring now to FIG. 2, in one embodiment of the present invention, the second controller 90 includes a battery residual capacity information receiving section 92 to receive the residual capacity information of the battery 40; the grid power usage cost (or charge) information receiving section 94 to receive an electrical power usage cost (or charge) information of the grid 3; a switch control section 96 to control an operation of the first switch (SW1) to control a coupling with the internal load X of the power conditioning system 100, the load 4, and the battery 40 (e.g., the battery 40 via the PCS 100) and to control an operation of the second switch (SW2) to control a coupling with the internal load X of the power conditioning system 100, the load 4, and the grid 3.

In an embodiment of the present invention, a first reference capacity and a second reference capacity are stored in the battery residual capacity information receiving section 92 as the reference for determining (or analyzing) the residual capacity of the battery.

The first and second reference capacities may be determined by a choice of a user (or as appropriate according to the conditions of the system), for example, the first reference capacity may be set to 30% of a maximum capacity of the battery 40 and the second reference capacity may be set to 70% of a maximum capacity of the battery 40.

The battery residual capacity information receiving section 92 may compare the residual capacity information of the battery 40 (which may be monitored, calculated, and/or transmitted by the BMS 41) with the first and second reference capacity, and may transmit (or communicate) the value calculated by the comparison to the switch control section 96.

The first reference cost (or charge) value may be stored in the grid power usage cost information receiving section 94 as the reference for determining (or analyzing) the power usage cost (or charge) of the grid 3.

The reference charge may be set in plurality, but the embodiment of the present invention will be described as an example having the stored information for one reference cost for the convenience of the description.

The usage cost (or charge) information of the power provided from the grid 3 may be verified in real time through a smart meter (not shown). As an example, the grid power usage cost (or charge) information receiving section 94 may receive the information by embedding the smart meter into the internal portion of the energy storage system (ESS) 1 (e.g., the second controller 90 of the ESS 1) or by connecting with the smart meter.

The value of the first reference cost may be determined by the choice of the user (or as appropriate according to the conditions of the system).

The grid power usage cost information receiving section 94 may compare the received power usage cost information of the grid 3 with the first reference cost, and may apply (transmit or communicate) the value calculated by the comparison to the switch control section 96.

While FIGS. 1A and 1B show a configuration of the second controller 90 separated from the first controller 80 included in the power conditioning system 100, the first controller 80 and the second controller 90 may be integrated into one integrated circuit (IC).

Accordingly, aspects of embodiments of the present invention provide an efficient (e.g., economically efficient) electrical consumption and a minimized or reduced cost by selectively providing the power of the battery 40 or the grid 3 to the internal load X of the power conditioning system 100 and/or the load 4 according to the second controller 90 and the first and second switches (SW1, SW2).

A method of controlling an energy storage system according to an embodiment of the present invention will be described with reference to FIG. 3.

FIG. 3 is a flowchart showing a method of controlling an energy storage system according to an embodiment of the present invention.

After starting the operation of energy storage system, the residual capacity information of the battery and the energy usage cost information of the grid 3 may be received (e.g., received through the battery residual capacity information receiving section 92 provided in the second controller 90 and the grid power usage cost information receiving section 94) (S100).

The residual capacity information of the battery 40 and the energy usage cost (or charge) information of the grid 3 may then be compared with the first and second reference capacities and the first reference cost (or charge) (S110).

The coupling with the internal load X of the power conditioning system 100, the load 4 and the battery 40 (or the battery 40 via the PCS 100), and the coupling with the internal load X of the power conditioning system 100, the load 4 and the grid 3, may then be controlled according to the comparison (S120).

The power of the grid 3 or the power of the battery 40 may then be selectively provided to the internal load X of the power conditioning system 100, and selectively provided to the load 4 (e.g., the external load) according to the controlled coupling (S130).

For example, the second controller 90 may compare the residual capacity information of the battery 40 and the energy usage cost (or charge) information of the grid 3 with the first and second reference capacities and the first reference cost (or charge) (S110). The second controller 90 may then control an operation of the first switch SW1 controlling a coupling with the internal load X of the power conditioning system 100, the load 4, and the battery 40 (or the battery 40 via the PCS 100) and an operation of the second switch SW2 controlling a coupling with the internal load X of the power conditioning system 100, the load 4, and the grid 3 (S120). Additionally, the second controller 90 may selectively implement (e.g., couple) the subject (e.g., the grid 3 or the battery 40) providing the power applied to the internal load X of the power conditioning system 100 and/or the load 4 (S130).

In an embodiment of the present invention, if the energy usage cost (or charge) of the grid 3 is below the first reference cost (S122), the first switch (SW1) coupled to the battery 40 (e.g., coupled to the battery 40 via the PCS 100) is controlled to be coupled to the C terminal and the second switch (SW 2) coupled to the grid 3 is controlled to be coupled to the A terminal and the B terminal (S122). That is, the electrical power of the grid 3 is provided to the internal load X of the power conditioning system 100 and the load 4 (S132).

That is, in this embodiment, if the energy usage cost (or charge) is below the first reference cost (or charge), the controller determines that it is less expensive to use the power of the grid 3 as the consumption power of the load 4 and the internal power of the energy storage system 1.

In an embodiment of the present invention, if the energy usage cost (or charge) of the grid 3 is above the first reference cost, the power source provided to the internal load X of the power conditioning system 100 and the load 4 is selected by additionally considering the residual capacity of the battery 40.

For example, if the energy usage cost (or charge) of the grid 3 is above the first reference cost and the residual capacity of the battery 40 is below the first reference capacity (S114), the first switch SW1 coupled to the battery 40 (e.g., coupled to the battery 40 via the PCS 100) is controlled to be coupled to the C terminal and the second switch SW2 is controlled to be coupled to the A terminal and the B terminal (S124). That is, the electrical power of the grid 3 is provided to the internal load X of the power conditioning system 100 and the load 4 (S134).

That is, even if the energy usage cost (or charge) of the grid 3 is above the first reference cost, if the residual capacity of the battery 40 is below the first reference capacity (e.g., 30%), the controller selects the power of the grid 3 as the consumption power of the load 4 and the internal power of the energy storage system 1.

For another example, if the energy usage cost (or charge) of the grid 3 is above the first reference cost, the residual capacity of with the battery 40 is above first reference capacity, and the residual capacity of the battery 40 is below the second reference capacity (S116), the first switch SW1 coupled to the battery 40 (e.g., coupled to the battery 40 via the PCS 100) is controlled to be coupled to the A terminal and the second switch SW2 coupled to the grid 3 is controlled to be coupled to the B terminal(S126). That is, the electrical power of the battery 40 is provided to the internal load X of the power conditioning system 100 and the power of the grid 3 is provided to the load 4 (S136).

That is, if the residual capacity of the battery 40 is within an appropriate range (e.g., from 30% to 70%), the battery 40 may be used as the internal consumption power of the energy storage system 1 and the power of the grid 3 may be used as the consumption of the load 4.

As a final example, if the energy usage cost (or charge) of the grid 3 is above the first reference cost and the residual capacity of the battery 40 is above the second reference capacity (S118), the second switch SW2 coupled to the grid 3 is controlled to be coupled to the C terminal and the first switch SW1 coupled to the battery 40 (e.g., coupled to the battery 40 via the PCS 100) is controlled to be coupled to the A terminal and the B terminal (S128). That is, the electrical power of the battery 40 is provided to the internal load X of the power conditioning system 100 and the load 4 (S138).

That is, if the residual capacity of the battery 40 is above the second reference capacity (as an example, 70%), the controller may determine that the capacity of the battery 40 is greater and the power of the battery 40 may be used as the consumption of the load 4 and the internal consumption of the energy storage system 1.

Aspects of embodiments of the present invention provide for a energy storage system and a controlling method for providing an efficient power consumption and a minimized or reduced power usage charge by choosing the subject providing the power to an internal portion of the power storage system and a load according a power usage charge of the grid and/or the residual capacity of the battery 40.

As those skilled in the art would realize, the described embodiments may be modified in various different ways, all without departing from the spirit or scope of the present invention as disclosed in the specification or claimed and their equivalents.

What is claimed is:

1. An energy storage system comprising:
   a battery;
   a power conditioning system coupled to the battery;
   switches configured to be coupleable to one or more of an internal load of the power conditioning system, the battery, a grid, and an external load; and
   a controller being configured to:
      receive energy usage cost information of the grid and residual capacity information of the battery;
      determine which of an energy of the battery or an energy of the grid is to be provided to the external load, and determine which of the energy of the battery or the energy of the grid is to be provided to the internal load, according to the energy usage cost information of the grid and the residual capacity information of the battery; and
      control the switches according to the determinations to provide the energy of the battery or the energy of the grid to the external load, and to provide the energy of the battery or the energy of the grid to the internal load,
   wherein the controller is configured to control the switches such that the energy of the battery is provided to the internal load while the energy of the grid is provided to the external load when the energy usage cost information corresponds to an energy cost that is above a reference cost while the residual capacity information of the battery corresponds to a residual capacity of the battery being within a reference capacity range.

2. The energy storage system of claim 1, wherein the switches comprise:
   a first switch configured to provide the energy of the battery to at least one of the external load or the internal load; and
   a second switch configured to provide the energy of the grid to at least one of the external load or the internal load.

3. The energy storage system of claim 2, wherein the first switch comprises:
   a first terminal coupled to the battery;
   a second terminal coupled to the internal load;

a third terminal coupled to the external load; and
a fourth terminal not coupled to any of the external load and the internal load, and
wherein the first switch is configured to couple the first terminal to at least one of the second terminal, the third terminal, or the fourth terminal, according to a signal from the controller.

4. The energy storage system of claim 3, wherein the first terminal is coupled to the battery through the power conditioning system.

5. The energy storage system of claim 2, wherein the second switch comprises:
a first terminal coupled to the grid;
a second terminal coupled to the internal load;
a third terminal coupled to the external load; and
a fourth terminal not coupled to any of the external load and the internal load, and
wherein the second switch is configured to couple the first terminal to at least one of the second terminal, the third terminal, or the fourth terminal according to a signal from the controller.

6. The energy storage system of claim 2, wherein the controller comprises:
a battery residual capacity information device configured to receive the residual capacity information of the battery;
a grid energy usage cost information device configured to receive the energy usage cost information of the grid; and
a switch controller configured to control the first switch and the second switch according to the received residual capacity information and the received energy usage cost information.

7. The energy storage system of claim 6, wherein the battery residual capacity information device is configured to:
store a value of a first reference capacity and a value of a second reference capacity;
calculate a capacity value according to a comparison of the received residual capacity information of the battery with the first reference capacity and the second reference capacity; and
transmit the capacity value to the switch controller, and
wherein the value of the first reference capacity and the value of the second reference capacity correspond to the reference capacity range.

8. The energy storage system of claim 6, wherein
the grid energy usage cost information device is configured to:
store a first reference cost value;
calculate an energy usage cost value according to a comparison of the received energy usage cost information of the grid with the first reference cost value; and
transmit the energy usage cost value to the switch controller.

9. The energy storage system of claim 1, wherein the power conditioning system comprises:
an energy conversion device configured to convert an energy generated from a generating system to a DC link voltage;
an inverter configured to invert the DC link voltage to an AC voltage of the grid or to convert the AC voltage of the grid to the DC link voltage;
a converter configured to convert the DC link voltage to a battery voltage for charging the battery or convert the battery voltage to the DC link voltage;

a battery management system coupled to the battery, the battery management system being configured to control a charging and discharging operation of the battery; and
a power conditioning controller configured to monitor the generating system, the grid, the battery, and the load, and configured to control the energy conversion device, the inverter, converter, and the battery management system.

10. A method of controlling an energy storage system comprising a power conditioning system and a battery, the method comprising:
receiving energy usage cost information of a grid and residual capacity information of the battery;
determining which of an energy of the battery or an energy of the grid is to be provided to an external load, and determining which of the energy of the battery or the energy of the grid is to be provided to an internal load, according to the energy usage cost information of the grid and the residual capacity information of the battery; and
providing at least one of the energy of the grid or the energy of the battery to the internal load of the energy storage system or the external load,
wherein the energy of the battery is provided to the internal load while the energy of the grid is provided to the external load when the energy usage cost information corresponds to an energy cost that is above a reference cost while the residual capacity information of the battery corresponds to a residual capacity of the battery being within a reference capacity range.

11. The method of claim 10, further comprising
storing a reference cost relating to a grid power usage cost value;
storing a first reference capacity relating to a residual capacity of the battery;
storing a second reference capacity relating to the residual capacity of the battery higher than the first reference capacity;
performing an operation comprising at least one of:
comparing the energy usage cost information of the grid with the reference cost, or
comparing the residual capacity information of the battery with at least one of the first reference capacity or the second reference capacity; and
controlling a coupling with the internal load, the external load, and the battery and a coupling with the internal load, the external load, and the grid based on the operation,
wherein the first reference capacity and the second reference capacity correspond to the reference capacity range.

12. The method of claim 11, further comprising:
providing the energy of the grid to the external load and to the internal load when the energy usage cost information of the grid is below the reference cost.

13. The method of claim 11, further comprising:
providing the energy of the grid to the external load and to the internal load when the energy usage cost information of the grid is above the reference cost and the residual capacity information of the battery is below the first reference capacity.

14. The method of claim 11, further comprising:
providing the energy of the battery to the external load and to the internal load when the energy usage cost information of the grid is above the reference cost and the residual capacity information of the battery is above the second reference capacity.

* * * * *